(12) United States Patent
Ling et al.

(10) Patent No.: US 11,822,126 B2
(45) Date of Patent: Nov. 21, 2023

(54) SINGLE MODE AND MULTI-MODE WAVEGUIDE CROSSINGS

(71) Applicant: Cisco Technology, Inc., San Jose, CA (US)

(72) Inventors: Tao Ling, Breinigsville, PA (US); Shiyi Chen, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/654,000

(22) Filed: Mar. 8, 2022

(65) Prior Publication Data

US 2023/0288639 A1    Sep. 14, 2023

(51) Int. Cl.
  *G02B 6/28*    (2006.01)
  *G02B 6/125*    (2006.01)

(52) U.S. Cl.
  CPC ........... *G02B 6/2821* (2013.01); *G02B 6/125* (2013.01)

(58) Field of Classification Search
  None
  See application file for complete search history.

(56) References Cited

U.S. PATENT DOCUMENTS

| | | | | |
|---|---|---|---|---|
| 7,577,320 | B2 * | 8/2009 | Little | G02B 6/2804 385/125 |
| 2010/0027939 | A1 * | 2/2010 | Doerr | G02B 6/4298 385/46 |
| 2011/0158584 | A1 | 6/2011 | Popovic | |
| 2011/0194815 | A1 | 8/2011 | Fattal et al. | |
| 2020/0264369 | A1 | 8/2020 | Takabayashi et al. | |
| 2021/0124117 | A1 | 4/2021 | Jacob et al. | |

FOREIGN PATENT DOCUMENTS

| | | | |
|---|---|---|---|
| CN | 106371173 A | 2/2017 | |
| CN | 110031934 A | 7/2019 | |
| WO | WO-02103423 A2 * | 12/2002 | ......... G02B 6/12016 |

OTHER PUBLICATIONS

Low Loss Intersection of Si Photonic Wire Waveguides, Tatsuhiko Fukazawa et al 2004 Jpn. J. Appl. Phys. 43 646.

Ultralow loss single layer submicron silicon waveguide crossing for SOI optical interconnect, Yangjin Ma et al. Optics Express vol. 21, Issue 24, pp. 29374-29382 ((2013).

Ultracompact dual-mode waveguide crossing based on subwavelength multimode-interference couplers, Weijie Chang, et al. Photonics Research vol. 6, issue 7, pp. 660-665 (2018).

Multimode waveguide crossing with ultralow loss and low imbalance, Beibei Wu, Yu Yu, and Xinliang Zhang, Optics Express vol. 28, pp. 14705-14711 (2020).

* cited by examiner

*Primary Examiner* — Chad H Smith (74) *Attorney, Agent, or Firm* — Patterson + Sheridan, LLP (57) ABSTRACT

Embodiments herein describe a waveguide crossing that permits at least two optical signals to cross in two different directions. For example, one optical signal can propagate from left to right through the center of the waveguide crossing at the same time a second optical signal propagates up and down through the center of the crossing. In one embodiment, a circular disc is disposed at the center of the waveguide crossing through which the two (or more) optical signals pass. The shape of the circular disc can provide low insertion loss as the respective optical signals propagate between respective pairs of waveguides, as well as minimize cross talk between the two optical signals.

20 Claims, 10 Drawing Sheets

SINGLE MODE AND MULTI-MODE WAVEGUIDE CROSSINGS

TECHNICAL FIELD

Embodiments presented in this disclosure generally relate to waveguide crossings in a photonic chip.

BACKGROUND

Waveguide crossover is an important building block to make on-chip optical routing into a cross-grid form to achieve large-scale, high density photonic chips (also referred to as an photonic integrated circuits (IC)). With wavelength-division-multiplexing (WDM) and mode-division-multiplexing (MDM) technologies being used to increase link capacity in optical communication systems, single mode waveguide crossings and multi-mode waveguide crossings with broadband operation that can work for different orders of optical modes and different operational wavelengths are of particular interest. It is desirable that these waveguide crossing should have low insertion loss, low crosstalk between the optical signals, broadband operation, easy to fabricate, and easy to reconfigure.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a waveguide crossing that includes a first pair of aligned waveguides, a second pair of aligned waveguides, and a circular disc disposed between the first pair of aligned waveguides and between the second pair of aligned waveguides. Moreover, each of the first and second pairs of aligned waveguides has a first portion that contacts the circular disc at a respective end and tapers along a respective length as the respective waveguide extends towards the circular disc.

Another embodiment is a waveguide crossing that includes a first pair of aligned waveguides, a second pair of aligned waveguides, and a disc disposed between the first pair of aligned waveguides and between the second pair of aligned waveguides. The disc has a circle shape or a slightly elliptical shape. Moreover, each of the first and second pairs of aligned waveguides has a first portion that contacts the disc at a respective end.

Another embodiment is a waveguide crossing that includes a first pair of aligned waveguides, a second pair of aligned waveguides, and a disc disposed between the first pair of aligned waveguides and between the second pair of aligned waveguides where the disc has a circle shape or an elliptical shape where a minor axis has a length that is not more than 10% different from a length of a major axis. Further, each of the first and second pairs of aligned waveguides has a first portion that contacts the disc at a respective end.

Example Embodiments

Embodiments herein describe a waveguide crossing that permits at least two optical signals to cross in two different directions. For example, one optical signal can propagate from left to right through the center of the waveguide crossing at the same time a second optical signal propagates from top to bottom through the center of the crossing. In one embodiment, a circular disc is disposed at the center of the waveguide crossing through which the two (or more) optical signals pass. The shape of the circular disc can provide low insertion loss as the respective optical signals propagate between respective pairs of waveguides, as well as minimize cross talk between the two optical signals.

In one embodiment, to further lower insertion loss and crosstalk, the waveguides connecting to the circular disc can taper. For example, respective input waveguides for the optical signals can taper as the waveguides approach the circular disc to focus the optical signals at a center of the circular disc to reduce scattering and crosstalk between the optical signals. Further, output waveguides for the respective waveguides can flare out as the waveguides extend away from the circular disc.

Further, the waveguide crossing can support single mode and multi-mode optical signals. For example, the multi-mode optical signal can contain optical power at both the fundamental mode and a higher order mode (e.g., the first order mode). To efficiently transmit multi-mode optical signals through the waveguide crossing, a broadband mode multiplexer (mux) can be used to convert the higher order mode in the multi-mode optical signal into the fundamental mode. The converted higher order mode and the fundamental mode in the multi-mode signal can then propagate through the waveguide crossing using different input ports. A broadband mode mux at the output of the waveguide crossing can then be used to reconvert the converted higher order mode from the fundamental mode back to the higher order mode, and recombine the higher order mode with the fundamental mode to reform the multi-mode optical signal.

Figure 1:
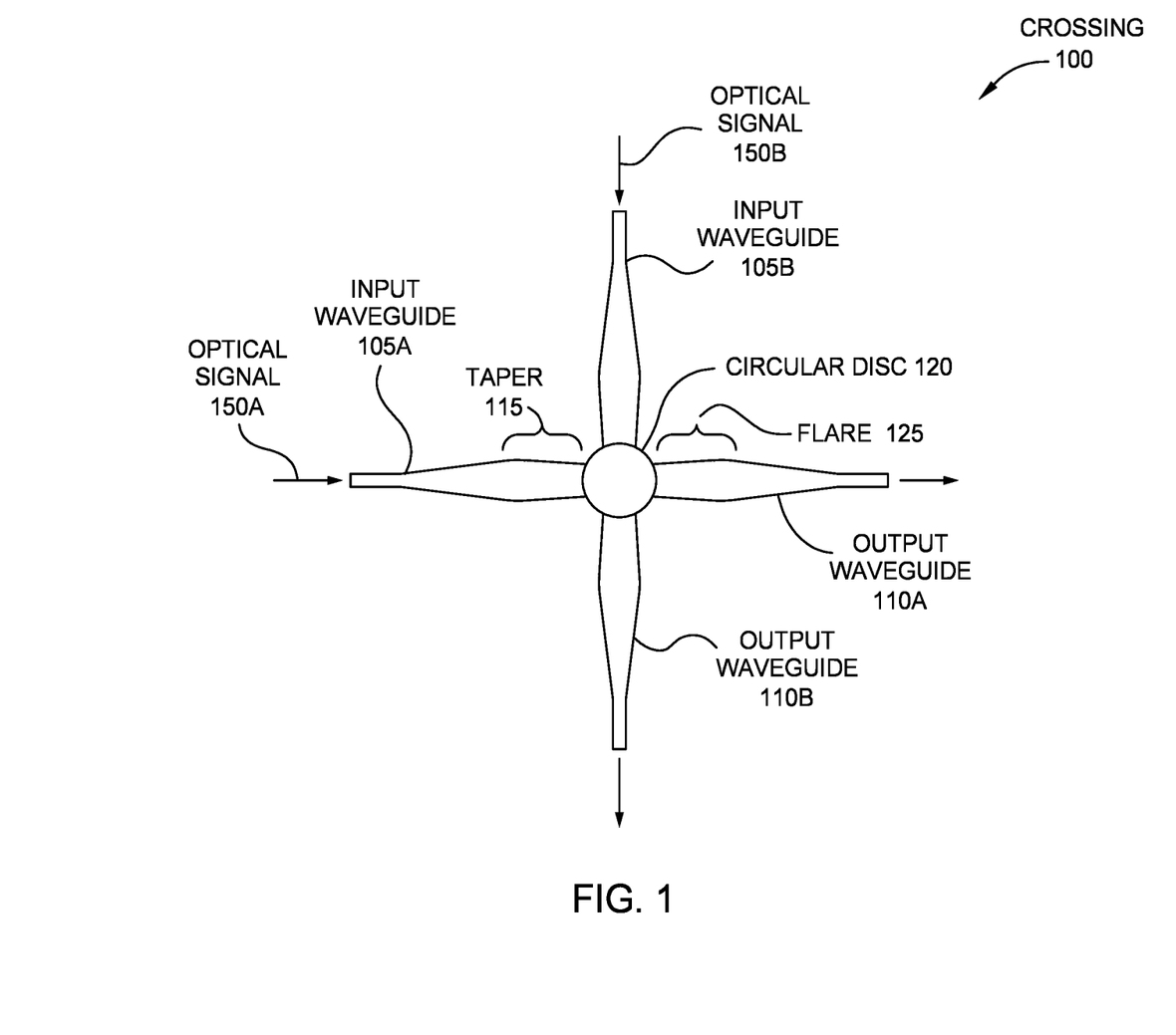
FIG. 1 illustrates a waveguide crossing with a circular disc, according to one embodiment.

FIG. 1 illustrates a waveguide crossing 100 with a circular disc 120, according to one embodiment. The waveguide crossing 100 includes two pairs of waveguides 105, 110 and the circular disc 120. Each pair of waveguides includes an input waveguide 105 and an output waveguide 110. The input waveguide 105A receives an optical signal 150A while the input waveguide 105B receives an optical signal 150B. The input waveguides 105 align the optical signals 150 to the circular disc 120, which the signals 150 propagate through to reach respective output waveguides 110. That is, the optical signal 150A propagates through the input waveguide 105A and the output waveguide 110A while the optical signal 150B propagates through the input waveguide 105B and the output waveguide 110B.

In this embodiment, the input and output waveguides 105, 110 in each pair are aligned in the same directions, and thus, can be referred to as pairs of aligned waveguides. That is, the input and output waveguides 105A and 110A are aligned in the horizontal direction while the input and output waveguides 105B and 110B are aligned in the vertical direction.

In this example, the optical signals 150 travel in directions that are perpendicular to each other (e.g., left/right and up/down) but this is not a requirement. For example, the angle between the input waveguides 105 and between the output waveguides 110 may be less than ninety degrees (e.g., 45 degrees).

In one embodiment, the crossing 100 is disposed in a photonic chip that can include a network or grid of waveguides formed from a plurality of crossings 100. In one embodiment, the material of the waveguides 105, 110 and the circular disc 120 are the same. For example, the waveguides 105, 110 and the circular disc 120 can be made from silicon nitride, silicon, or some other semiconductor material (e.g., a III-V semiconductor). Although not shown, the waveguides 105, 110 and the circular disc 120 can be encapsulated by a cladding material, such as a low index material.

The waveguides 105, 110 and the circular disc 120 can be fabricated in the same etching or processing step. For example, a layer of silicon nitride, silicon, or some other semiconductor material can be etched, in the same etching step, to form the waveguides 105, 110 and the circular disc 120. However, in other embodiments, the waveguides 105, 110 and the circular disc 120 can be formed using different etching steps. In any case, the height or thickness (i.e., the direction out of the page of FIG. 1) of the waveguides 105, 110 and the circular disc 120 may be the same.

In FIG. 1, the circular disc 120 has a circle shape. However, as used herein, a "circular disc" does not mean the disc 120 must have a perfect circle shape. For example, due to fabrication limitations, the circular disc 120 may not form a perfect circle shape but have a slight defect such as a bulge. Moreover, the circular disc 120 can include shapes that are slightly elliptical where the major and minor axes are not equal in length. In one embodiment, the major and minor axes of a slightly elliptical shape may be different by less than 10% and still be considered a circular disc. While a perfectly circle shape may result in optimal performance, for other reasons such as cost or fabrication limitations, the circular disc 120 can have a slightly elliptical shape or have defects that cause the circular disc 120 to differ from a perfect or ideal circle.

The input waveguides 105 have a taper region 115 where the waveguides taper and then contact the circular disc 120. Moving along the direction of the optical signals 150 towards the circular disc 120, the input waveguides first flare out before reaching the taper region 115 where the width of the input waveguides 105 shrinks along the length of the waveguide moving in a direction towards the circular disc 120. In FIG. 1, the reduction of the width of the waveguide in the taper region 115 is constant, but in other embodiments, the reduction of the width can vary along the length of the taper region 115.

In one embodiment, the taper region 115 is designed to focus the respective optical signal 150 so it is focused at a center of the circular disc 120. Doing so helps to reduce scattering so that there is less crosstalk between the pairs of waveguides. That is, the taper region 115 on the input waveguide 105A reduces the amount of the optical signal 150A that leaks or is scattered into the output waveguide 110B used by the optical signal 150B. The taper region on the input waveguide 105B (which is not labeled in FIG. 1) has a similar effect on the optical signal 150B to prevent it from leaking into the output waveguide 110A for the optical signal 150A.

In an alternative embodiment, the input waveguides 105 may only have the taper regions 115 but may not have the flare regions where the optical signals 150 enter the input waveguides 105. That is, the input waveguides 105 may have a constant width (rather than flaring) for approximately the first half of the input waveguides 105 until reaching the taper regions 115 where the optical signals 150 that focus the signals 150 into the circular disc 120. But removing the flare region can depend on the width of the waveguides at the inputs of the waveguides 105A and 105B.

In addition to tapering the input waveguides 105, the output waveguides 110 include flare regions 125 where the output waveguides 110 couple to the circular disc 120. That is, as the optical signals 150 leave the circular disc 120, they travel in the flare region 125 of the output waveguides 110 where the width of the waveguides 110 increases before then propagating through another taper region (not labeled) of the output waveguides 110 where the width of the waveguides 110 decreases before finally exiting the crossing 100. The flare regions 125 make the structure symmetric between left and right, up and down and minimize the optical loss. In FIG. 1, the increase of the width of the output waveguides 110 in the flare regions 125 is constant, but in other embodiments, the increase of the width can vary along the length of the flare region 125.

In an alternative embodiment, the output waveguides 110 have the flare regions 125 but do not have the tapering regions following the flare region 125. That is, after the flare regions 125, the widths of the output waveguides 110 may be constant.

In another embodiment, the waveguide crossing 100 includes the flare and tapering regions in the input waveguides 105, but not the flare and tapering regions in the output waveguides 110. That is, the output waveguides 110 may have a constant width. Alternatively, the waveguide crossing 100 can include the flare and tapering regions in the output waveguides 110, but not the flare and tapering regions in the input waveguides 105. In yet another embodiment, both the input and the output waveguides 105, 110 may have constant widths at the regions where they couple to the circular disc 120 (e.g., the crossing 100 may omit the taper regions 115 and the flare regions 125). This might result in more crosstalk between the optical signals 150 but may be a suitable tradeoff between other factors such as reducing fabrication costs. Thus, the taper regions 115 and the flare regions 125 are optional.

In one embodiment, the optical signals 150 are single mode optical signals where the light is transmitted in the fundamental mode. However, as discussed below, other types of crossings can be modified to efficiently transmit multi-mode signals.

The waveguide crossing 100 can be used with a variety of optical signals in different bands such as C-band and O-band. As such, the waveguide crossing 100 provides broadband operation at a wide range of wavelengths (e.g., the entire C-band or the entire O-band). That is, the design of the crossing 100 can be used for both O-band and C-band but the detailed design parameters such as the disc radius and taper/flare length widths may be different in O-band and C-band designs where one crossover design works for O-band and one crossover design works for C-band. The overall configuration for them is the same, but the detailed parameters may be different. Further, the optical signals 150A and 150B can propagate simultaneously through the waveguide crossing 100 with low insertion loss and minimal crosstalk.

Figure 2A:
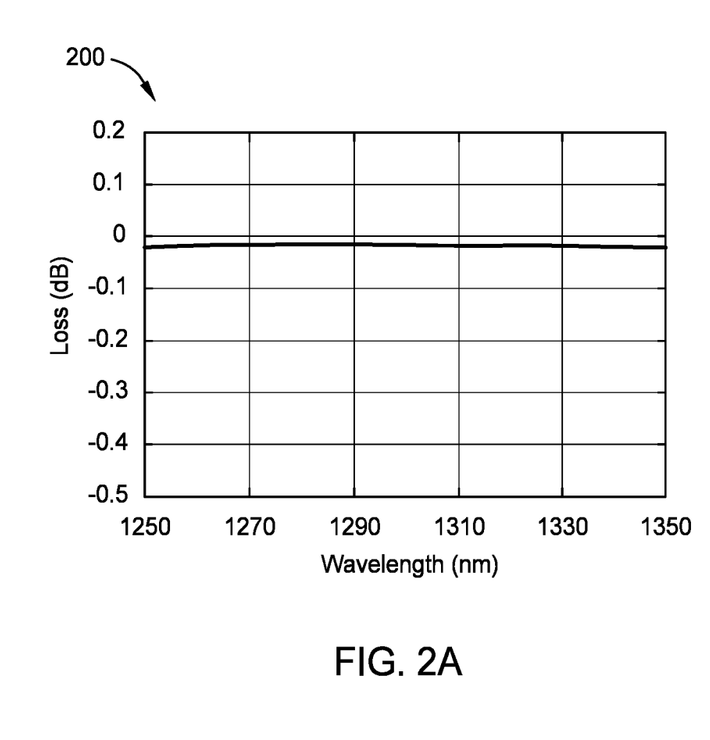
FIGS. 2A and 2B illustrate insertion loss and crosstalk for the structure shown in FIG. 1, according to embodiments.
Figure 2B:
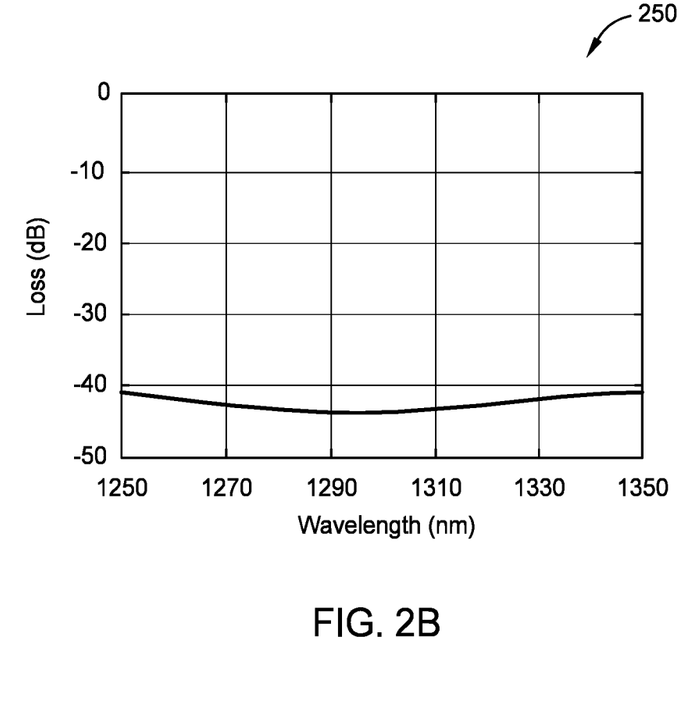

FIGS. 2A and 2B illustrate insertion loss and crosstalk for the structure shown in FIG. 1, according to embodiments. Specifically, FIGS. 2A and 2B illustrate measurements captured by launching the optical signal 150A into the input waveguide 105A in FIG. 1. FIG. 2A provides a chart 200 showing the insertion loss of the optical signal 150A as it propagates through the input waveguide 105A, through the circular disc 120, and out the output waveguide 110A. As shown, the insertion loss is very low (i.e., less than 0.03 dB) for a range of wavelengths between 1250 to 1350 nm.

FIG. 2B provides a chart 250 showing the crosstalk between the optical signal 150A as it propagates through the crossing 100 and the path used by the optical signal 150B to propagate through the crossing 100. That is, the chart 250 illustrates how much of the optical signal 150A leaks into the output waveguide 110B used by the optical signal 150B. As shown, the crosstalk is less than −40 dB for wavelengths of the optical signal 150A between 1250-1350 nm.

Figure 3:
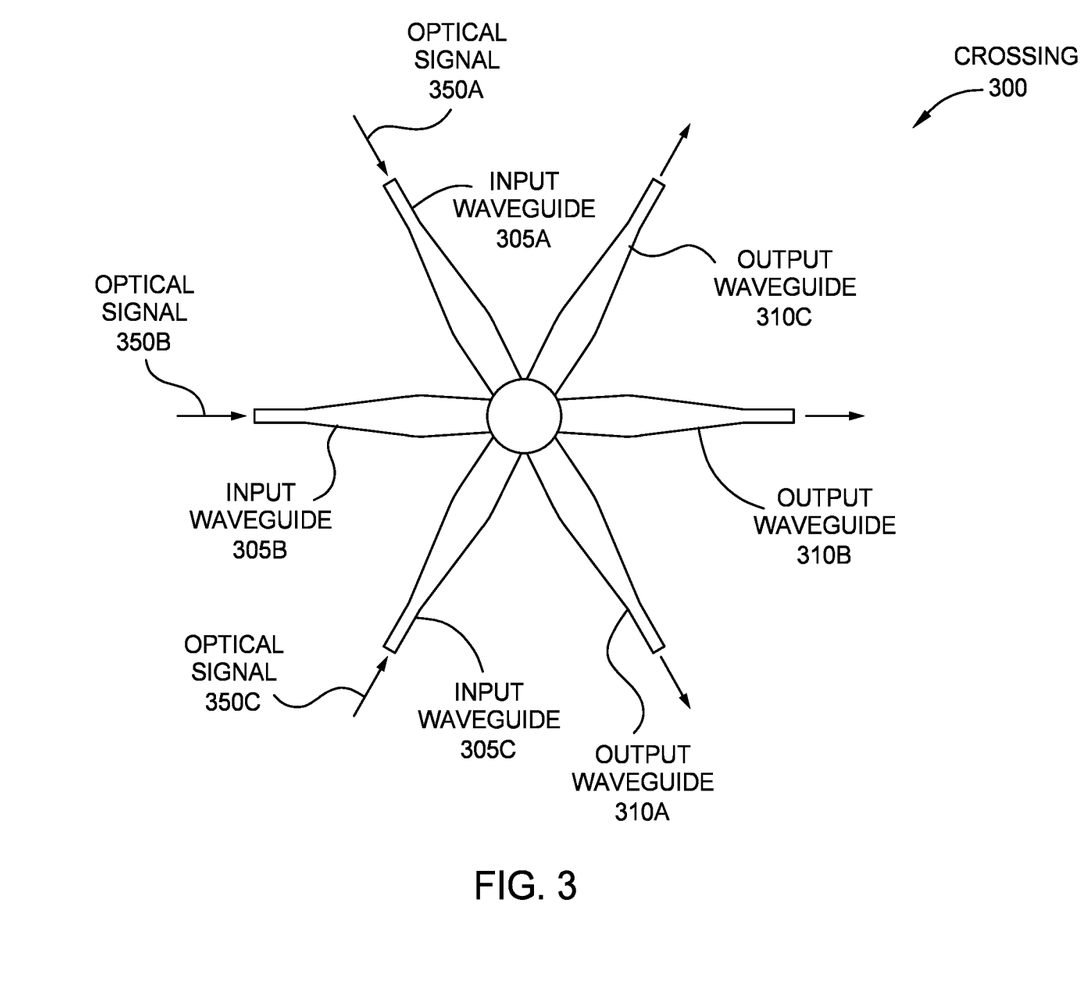
FIG. 3 illustrates a waveguide crossing with a circular disc, according to one embodiment.

FIG. 3 illustrates a waveguide crossing 300 with the circular disc 120, according to one embodiment. The waveguide crossing 300 includes three pairs of waveguides 305, 310 and the circular disc 120. Each pair of waveguides includes an input waveguide 305 and an output waveguide 310. The input waveguide 305A receives an optical signal 350A while the input waveguide 305B receives an optical signal 350B and the input waveguide 305C receives an optical signal 350C. The input waveguides 305 align the optical signals 350 to the circular disc 120, which the signals 350 propagate through to reach respective output waveguides 310. Further, the input and output waveguides 305, 310 in each pair are aligned in the same direction.

The optical signals 350 travel in different directions in the respective pair of waveguides 305, 310. In this example, the angle between the input waveguide 305A and the input waveguide 305B is the same as the angle between the input waveguide 305B and the input waveguide 305C. However, this equidistant spacing between the input waveguides 305 (and the output waveguides 310) is not a requirement. For example, the angle between the input waveguides 305A and 305B may be different than the angle between the input waveguides 305B and 305C.

In one embodiment, the crossing 300 is disposed in a photonic chip that can include a network or grid of waveguides formed from a plurality of crossings 300. In one embodiment, the material of the waveguides 305, 310 and the circular disc 120 are the same, e.g., silicon nitride, silicon, or some other semiconductor material (e.g., a III-V semiconductor). Although not shown, the waveguides 305, 310 and the circular disc 120 can be encapsulated by a cladding material, such as a low index material.

The input waveguides 305 and the output waveguides 310 in FIG. 3 have the same flare and taper regions as the input waveguides 105 and the output waveguides 110 in FIG. 1. These regions may have the same benefits and functions as discussed in FIG. 1. Further, the input waveguides 305 and the output waveguides 310 in FIG. 3 may have any of the other shapes as discussed in FIG. 1.

In one embodiment, the optical signals 350 are single mode optical signals where the light is transmitted in the fundamental mode. However, as discussed below, the crossing 300 can be modified to efficiently transmit multi-mode signals.

The waveguide crossing 300 can be used with a variety of optical signals in different bands such as C-band and O-band. As such, the waveguide crossing 300 provides broadband operation at a wide range of wavelengths (e.g., the entire C-band or the entire O-band). That is, the design of the crossing 300 can be used for both O-band and C-band but the detailed design parameters such as the disc radius and taper/flare length widths may be different in O-band and C-band designs where one crossover design works for O-band and one crossover design works for C-band. The overall configuration for them is the same, but the detailed parameters may be different. Further, the optical signals 350A-C can propagate simultaneously through the waveguide crossing 300 with low insertion loss and minimal crosstalk.

Figure 4A:
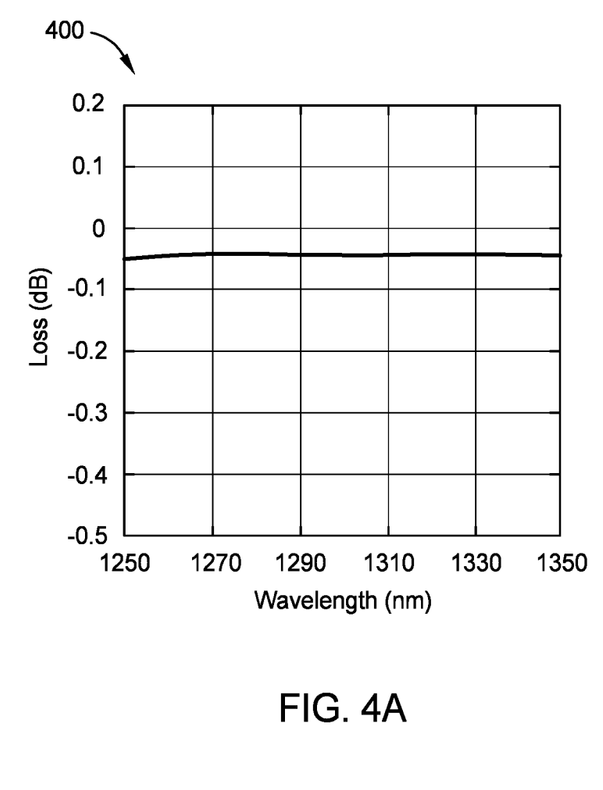
FIGS. 4A and 4B illustrate insertion loss and crosstalk for the structure shown in FIG. 3, according to embodiments.
Figure 4B:
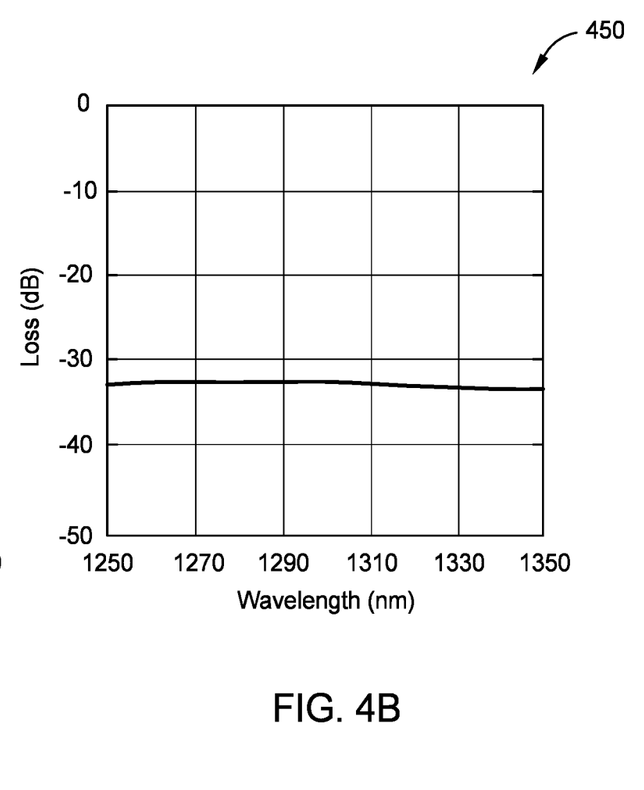

FIGS. 4A and 4B illustrate insertion loss and crosstalk for the structure shown in FIG. 3, according to embodiments. Specifically, FIGS. 4A and 4B illustrate measurements captured by launching the optical signal 350B into the input waveguide 305B in FIG. 3. FIG. 4A provides a chart 400 showing the insertion loss of the optical signal 350B as it propagates through the input waveguide 305B, through the circular disc 120 and out the output waveguide 310B. As shown, the insertion loss is very low (i.e., less than 0.05 dB) for a range of wavelengths between 1250 to 1350 nm.

FIG. 4B provides a chart 450 showing the crosstalk between the optical signal 350B as it propagates through the crossing 300 and the paths used by the optical signals 350A and 350C to propagate through the crossing 300. That is, the chart 450 illustrates how much of the optical signal 350B leaks into (i) the output waveguide 305A used by the optical signal 350A and into (ii) the input and output waveguide 310C used by the optical signal 350C. As shown, the crosstalk is less than −32 dB for both of the paths used by the optical signals 350A and 350C for wavelengths of the optical signal 350B between 1250-1350 nm.

Figure 5:
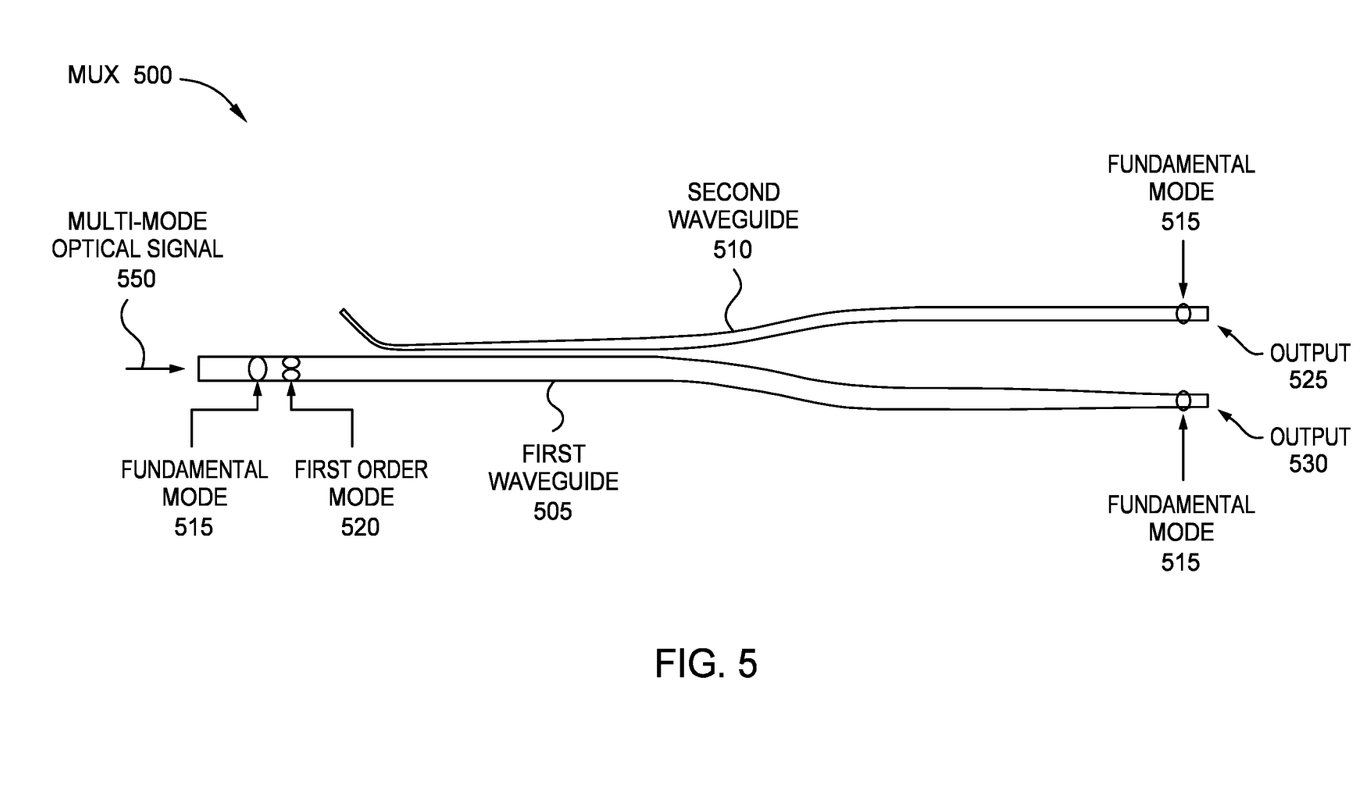
FIG. 5 illustrates a broadband mode multiplexer for multi-mode optical signals, according to one embodiment.

FIG. 5 illustrates a broadband mode mux 500 for multi-mode optical signals, according to one embodiment. As shown, the mux 500 includes a first waveguide 505 and a second waveguide 510, which is optically coupled to the first waveguide 505 such that a portion of the optical signal propagating through the first waveguide 505 can be transferred into the second waveguide 510.

The first waveguide 505 includes an input on its left end that receives a multi-mode optical signal 550. The multi-mode optical signal 550 can be any optical signal that has multiple modes. In this example, the signal 550 includes light in the fundamental mode 515 and a first order mode 520 (or more generally, a higher order mode). Thus, when the signal 550 enters the mux 500 (and more specifically, the first waveguide 505), the signal 550 includes two different optical modes.

As the optical signal 550 propagates from left to right in the first waveguide 505, the light in the first order mode 520 is transferred from the first waveguide 505 into the second waveguide 510. Furthermore, the optical signal power in the first order mode 520 is converted by the mux 500 into the fundamental mode 515. That is, the mux 500 is able to separate the optical power in the first order mode 520 from the optical power in the fundamental mode 515 and convert the optical power that was in the first order mode 520 to the fundamental mode 515. Thus, at the output of the second waveguide 510, the optical power that was previously in the first order mode 520 has been converted to an optical signal containing only the fundamental mode 515. Conversely, the optical power in the multi-mode optical signal 550 that was already in the fundamental mode 515 remains in the first waveguide 505 and in the fundamental mode 515. Thus, an output 530 of the first waveguide 505 includes the optical power in the multi-mode optical signal 550 that was already in the fundamental mode 515.

As will be discussed below, converting the optical power in the multi-mode optical signal 550 that was in the higher order mode (e.g., the first order mode 520) into the fundamental mode can advantageously reduce insertion loss when transmitting the multi-mode optical signal 550 through a waveguide crossing. That is, transmitting two optical signals that are in the fundamental mode 515 (which are at the outputs 525, 530 of the first and second waveguides 505, 510) through the waveguide crossing can experience much less insertion loss than directly transmitting the multi-mode optical signal 550 through the waveguide crossing (i.e., without first converting the light in the first order mode 520 to the fundamental mode 515).

Figure 6A:
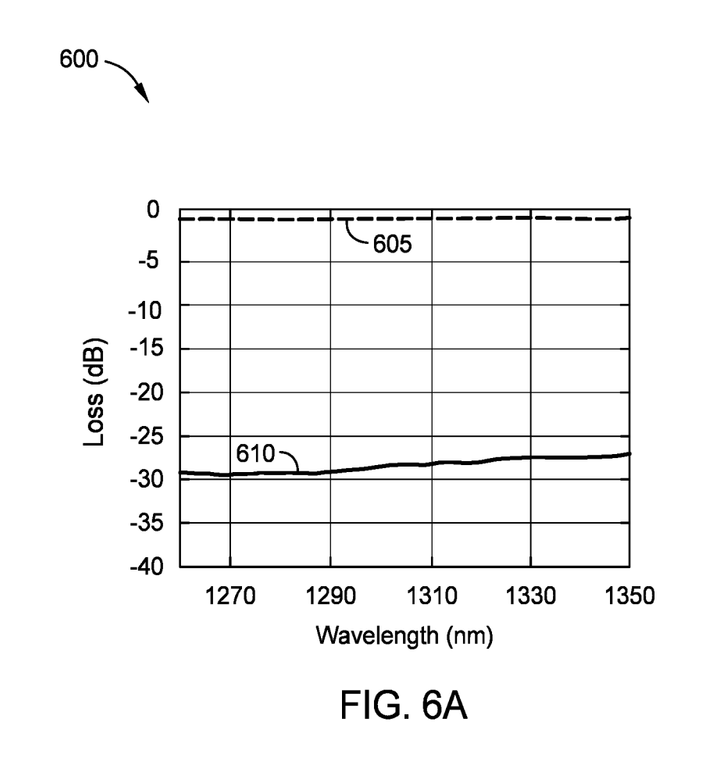
FIGS. 6A and 6B illustrate insertion loss and crosstalk for the structure in FIG. 5, according to embodiments.
Figure 6B:
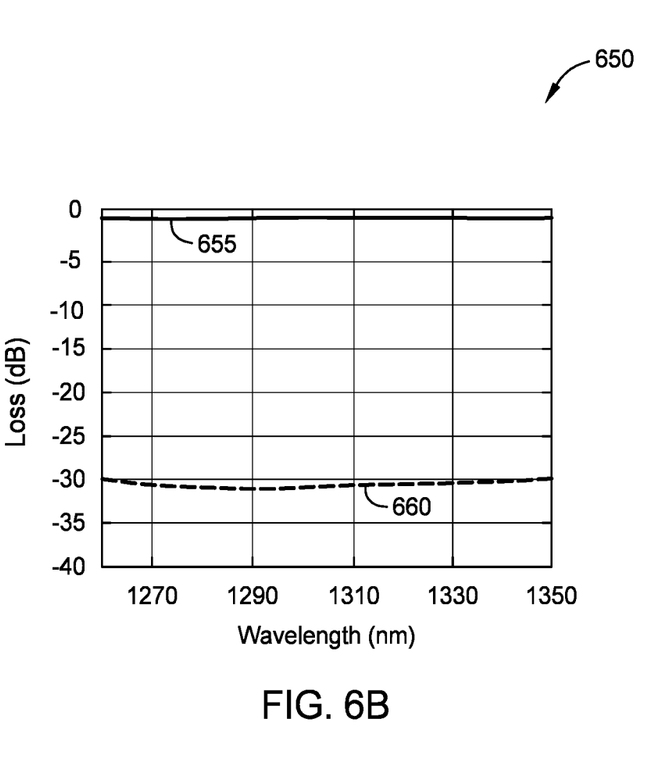

FIGS. 6A and 6B illustrate insertion loss for the structure in FIG. 5, according to embodiments. Specifically, FIG. 6A illustrates a chart 600 showing the loss of the optical power in the first order mode 520 of the multi-mode optical signal 550 at the outputs 525, 530 of the first and second waveguides 505, 510. The line 605 illustrates the loss of the first order mode at the output 525 of the second waveguide 510 while the line 610 illustrates the loss of the first order mode at the output 530 of the first waveguide 505. The line 605 has a loss of less than 0.1 dB indicating that the vast majority of the light in the first order mode exits through the output 525 of the second waveguide 510. In contrast, the line 610 has a loss between −27 to −30 dB, indicating that very little light in the first order mode exits through the output 530 of the first waveguide 505. As such, the chart 600 illustrates that most of the light in the first order mode 520 propagates through the second waveguide 510.

FIG. 6B illustrates a chart 650 showing the loss of the optical power in the fundamental mode 515 of the multi-mode optical signal 550 at the outputs 525, 530 of the first and second waveguides 505, 510. The line 655 illustrates the loss of the fundamental mode at the output 530 of the first waveguide 505 while the line 660 illustrates the loss of the fundamental mode at the output 525 of the second waveguide 510. The line 655 has a loss of less than 0.1 dB indicating that the vast majority of the light in the fundamental mode exits through the output 530 of the first waveguide 505. In contrast, the line 660 has a loss below −30 dB, indicating that very little light in the fundamental mode exits through the output 525 of the second waveguide 510. As such, the chart 650 illustrates that most of the light in the fundamental mode 515 propagates through the first waveguide 505.

Figure 7:
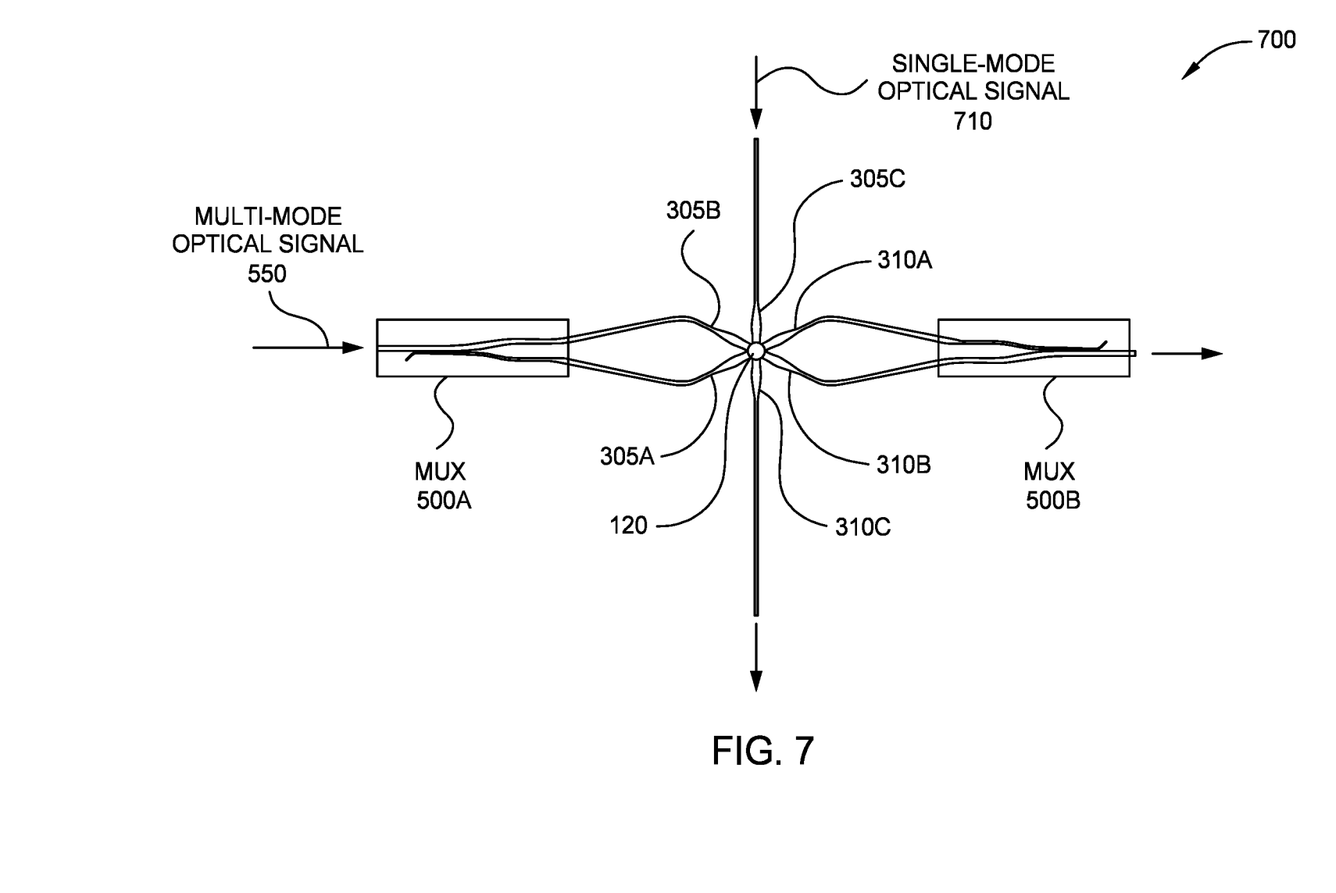
FIG. 7 illustrates a waveguide crossing with broadband mode multiplexers for multi-mode optical signals, according to one embodiment.

FIG. 7 illustrates a waveguide crossing 700 with broadband mode muxes 500 for multi-mode optical signals, according to one embodiment. In one embodiment, the waveguide crossing 700 includes the waveguide crossing 300 from FIG. 3 with three input waveguides 305A-C and three output waveguides 310A-C and the circular disc 120.

In this example, the outputs of a first broadband mode mux 500A are attached to the input waveguides 305A and 305B. The multi-mode optical signal 550 is then input into the mux 500A. As discussed in FIG. 5, the mux 500A separates the optical power in the optical signal 550 in the fundamental mode from the optical power in the signal 550 in the first order mode (e.g., a higher order mode). Further, the mux 500A converts the optical power in the signal 550 in the first order mode to the fundamental mode. As such, the input waveguide 305A receives the optical power in the multi-mode optical signal 550 that was in the first order mode but has been converted by the mux 500A into the fundamental mode while the input waveguide 305B receives the optical power in the multi-mode optical signal 550 that was already in the fundamental mode. Thus, both input waveguides 305A and 305B transmit light in the fundamental mode.

The input waveguide 305C receives a single-mode optical signal 710, which includes optical power only in a single mode—e.g., the fundamental mode. Thus, in this example, the input waveguides 305A-C transmit light having the fundamental mode into the circular disc 120 and into respective output waveguides 310A-C.

The output waveguide 310C receives the single-mode optical signal 710 and can propagate it to downstream waveguides and optical components (not shown) in the photonic chip. In contrast, outputs of the output waveguides 310A and 310B are coupled to a second broadband mode mux 500B. The second mux 500B reverses the process performed by the first mux 500A. That is, the optical signal transmitted by the output waveguide 310A is converted back to the first order mode and recombined with the signal transmitted by the output waveguide 310B. That is, because the output waveguide 310A transmits the portion of the multi-mode optical signal 550 that was in the first order mode but was converted into the fundamental mode, the second mux 500B converts this optical signal back to the first order mode and recombines it with the portion of the multi-mode optical signal 550 that was already in the fundamental mode, which was transmitted by the output waveguide 310B.

FIG. 7 illustrates two pairs of waveguides being coupled to two muxes 500. In this example, the waveguides 305A and 305B are coupled to the mux 500A while the remaining waveguides in the two pairs (i.e., waveguides 310A and 310B) are coupled to the mux 500C.

The output of the second mux 500B is the same multi-mode optical signal 550 that was input into the first mux 500A (with minimal insertion loss and crosstalk). In this manner, the waveguide crossing 700 can use the muxes 500A and 500B to efficiently transmit the multi-mode optical signal 550 through the crossing 700. In contrast, the multi-mode optical signal 550 could have been directly coupled into one of the input waveguides 305. However, since the portion of the multi-mode optical signal 550 in the first order mode would have suffered much greater insertion loss and crosstalk when passing through the circular disc 120, the multi-mode optical signal output by the crossing in that case would be substantially different from the multi-mode optical signal input into the crossing. By first converting the portion of the multi-mode optical signal 550 in the first order mode into the fundamental mode before transmitting the signal through the circular disc, the insertion loss and crosstalk is minimal. Thus, the waveguide crossing 700 illustrates an efficient structure for crossing the multi-mode optical signal 550 with the single-mode optical signal 710.

Figure 8:
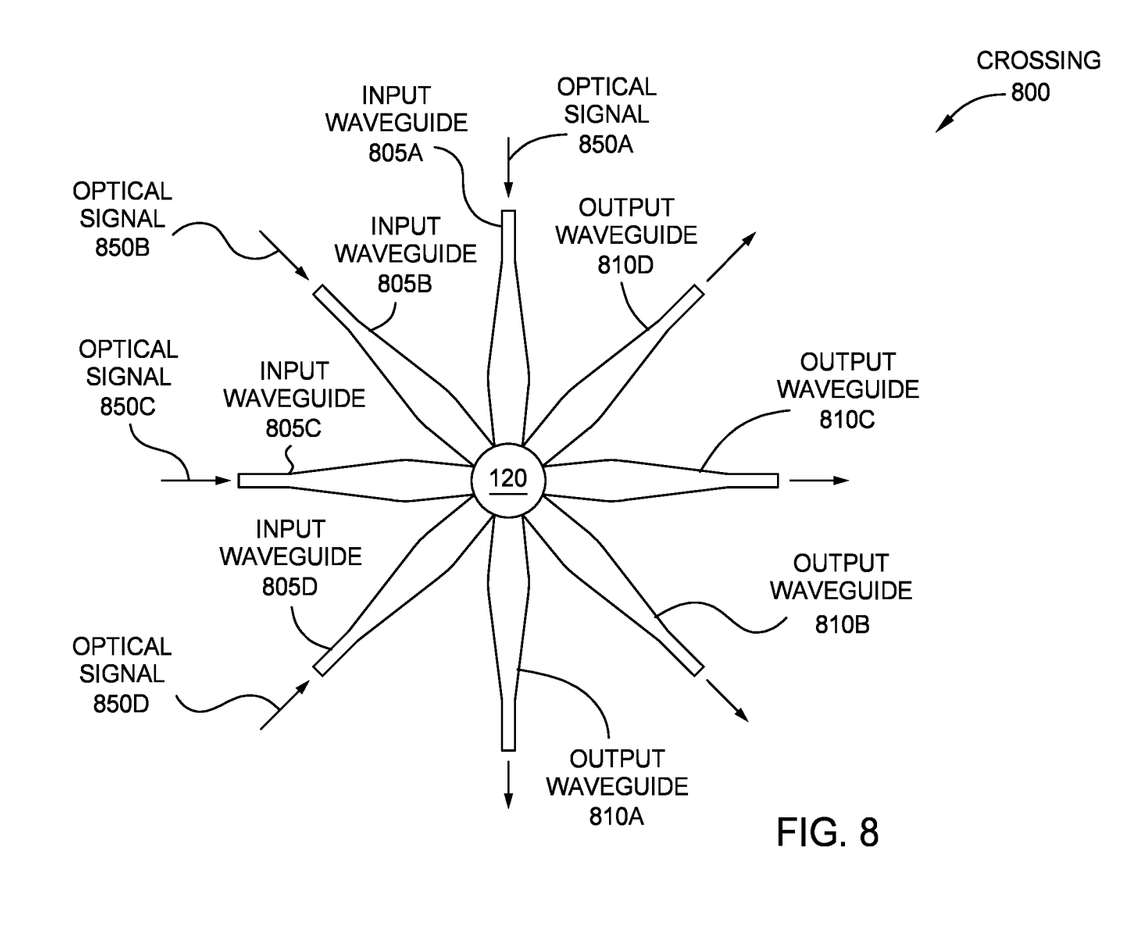
FIG. 8 illustrates a waveguide crossing with a circular disc, according to one embodiment.

FIG. 8 illustrates a waveguide crossing 800 with a circular disc 120, according to one embodiment. The waveguide crossing 800 includes four pairs of waveguides 805, 810 and the circular disc 120. Each pair of waveguides includes an input waveguide 805 and an output waveguide 810. The input waveguide 805A receives an optical signal 850A while the input waveguide 805B receives an optical signal 850B, the input waveguide 805C receives an optical signal 850C, and the input waveguide 805D receives an optical signal 850D. The input waveguides 805 align the optical signals 850 to the circular disc 120, which the signals 850 propagate through to reach respective output waveguides 810. Further, the input and output waveguides 805, 810 in each pair are aligned in the same direction.

The optical signals 850 travel in different directions in the respective pair of waveguides 805, 810. In this example, the angle between the input waveguide 805A and the input waveguide 805B is that same as the angle between the input waveguide 805B and the input waveguide 805C and the angle between the input waveguide 805C and the input waveguide 805D. However, this equidistant spacing between the input waveguides 805 (and the output waveguides 810) is not a requirement. For example, the angle between the input waveguides 805A and 805B may be different than the angle between the input waveguides 805B and 805C, and so forth.

In one embodiment, the crossing 800 is disposed in a photonic chip that can include a network or grid of waveguides formed from a plurality of crossings 800. In one embodiment, the material of the waveguides 805, 810 and the circular disc 120 are the same, e.g., silicon nitride, silicon, or some other semiconductor material (e.g., an III-V semiconductor). Although not shown, the waveguides 805, 810 and the circular disc 120 can be encapsulated by a cladding material, such as a low index material.

The input waveguides 805 and the output waveguides 810 in FIG. 8 have the same flare and taper regions as the input waveguides 105 and the output waveguides 110 in FIG. 1 (and FIG. 3). These regions may have the same benefits and functions as discussed in FIG. 1. Further, the input waveguides 805 and the output waveguides 810 in FIG. 8 may have any of the other shapes as discussed in FIG. 1.

In one embodiment, the optical signals 850 are single mode optical signals where the light is transmitted in the fundamental mode. However, as discussed below, the crossing 800 can be modified to efficiently transmit multi-mode signals.

The waveguide crossing 800 can be used with a variety of optical signals in different bands such as C-band and O-band. As such, the waveguide crossing 800 provides broadband operation at a wide range of wavelengths (e.g., the entire C-band or the entire O-band). That is, the design of the crossing 800 can be used for both O-band and C-band but the detailed design parameters such as the disc radius and taper/flare length widths may be different in O-band and C-band designs where one crossover design works for O-band and one crossover design works for C-band. The overall configuration for them is the same, but the detailed parameters may be different. Further, the optical signals 850A-D can propagate simultaneously through the waveguide crossing 800 with low insertion loss and minimal crosstalk.

Figure 9A:
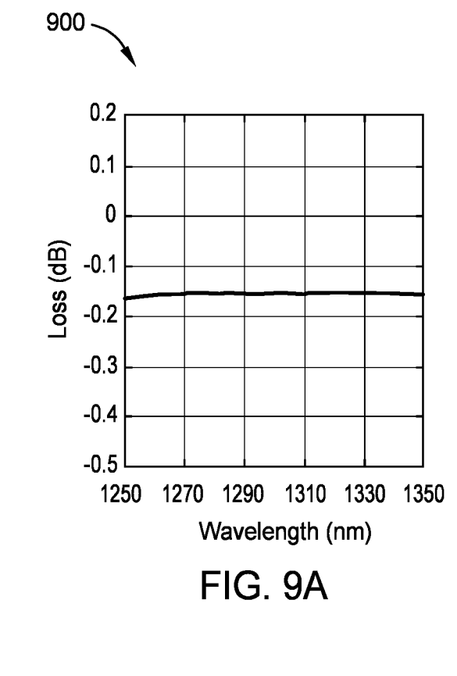
FIGS. 9A-9C illustrate insertion loss and crosstalk for the structure in FIG. 8, according to embodiments.
Figure 9B:
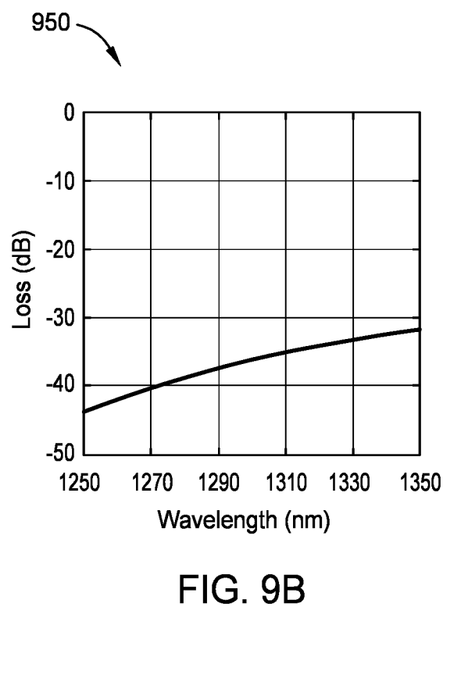
Figure 9C:
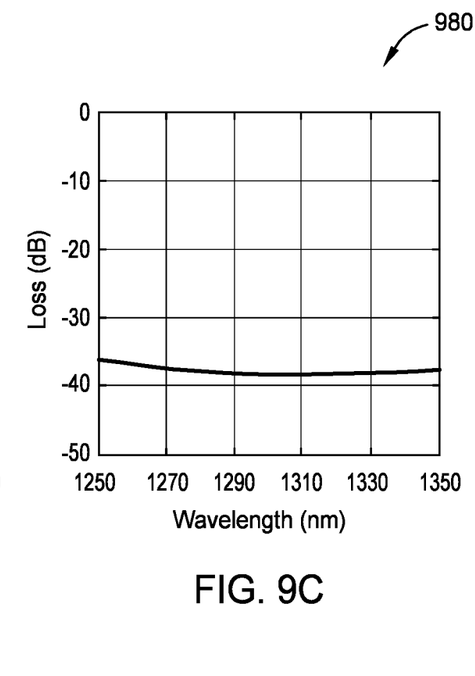

FIGS. 9A-9C illustrate loss and crosstalk for the structure in FIG. 8, according to embodiments. Specifically, FIGS. 9A-9C illustrate measurements captured by launching the optical signal 850C into the input waveguide 805C in FIG. 8. FIG. 9A provides a chart 900 showing the insertion loss of the optical signal 850C as it propagates through the input waveguide 805C, through the circular disc 120 and out the output waveguide 810C. As shown, the insertion loss is very low (i.e., less than 0.15 dB) for a range of wavelengths between 1250 to 1350 nm.

FIG. 9B provides a chart 950 showing the crosstalk between the optical signal 850C as it propagates through the crossing 800 and the paths used by the optical signals 850B and 850D (which are transmitted on input waveguides 805B, 805D neighboring the input waveguide 805C used by the optical signal 850C) to propagate through the crossing 800. That is, the chart 950 illustrates how much of the optical signal 850C leaks into (i) the output waveguide 810B used by the optical signal 850B and into (ii) the output waveguide 810D used by the optical signal 850D. As shown, the crosstalk is less than −30 dB for both of the paths used by the optical signals 850B and 850D for wavelengths of the optical signal 850C between 1250-1350 nm.

FIG. 9C provides a chart 980 showing the crosstalk between the optical signal 850C as it propagates through the crossing 800 and the path used by the optical signal 850A to propagate through the crossing 800. That is, the chart 980 illustrates how much of the optical signal 850C leaks into the output waveguide 810A used by the optical signal 850A. As shown, the crosstalk is less than −30 dB for the path used by the optical signal 850A for wavelengths of the optical signal 850C between 1250-1350 nm.

Figure 10:
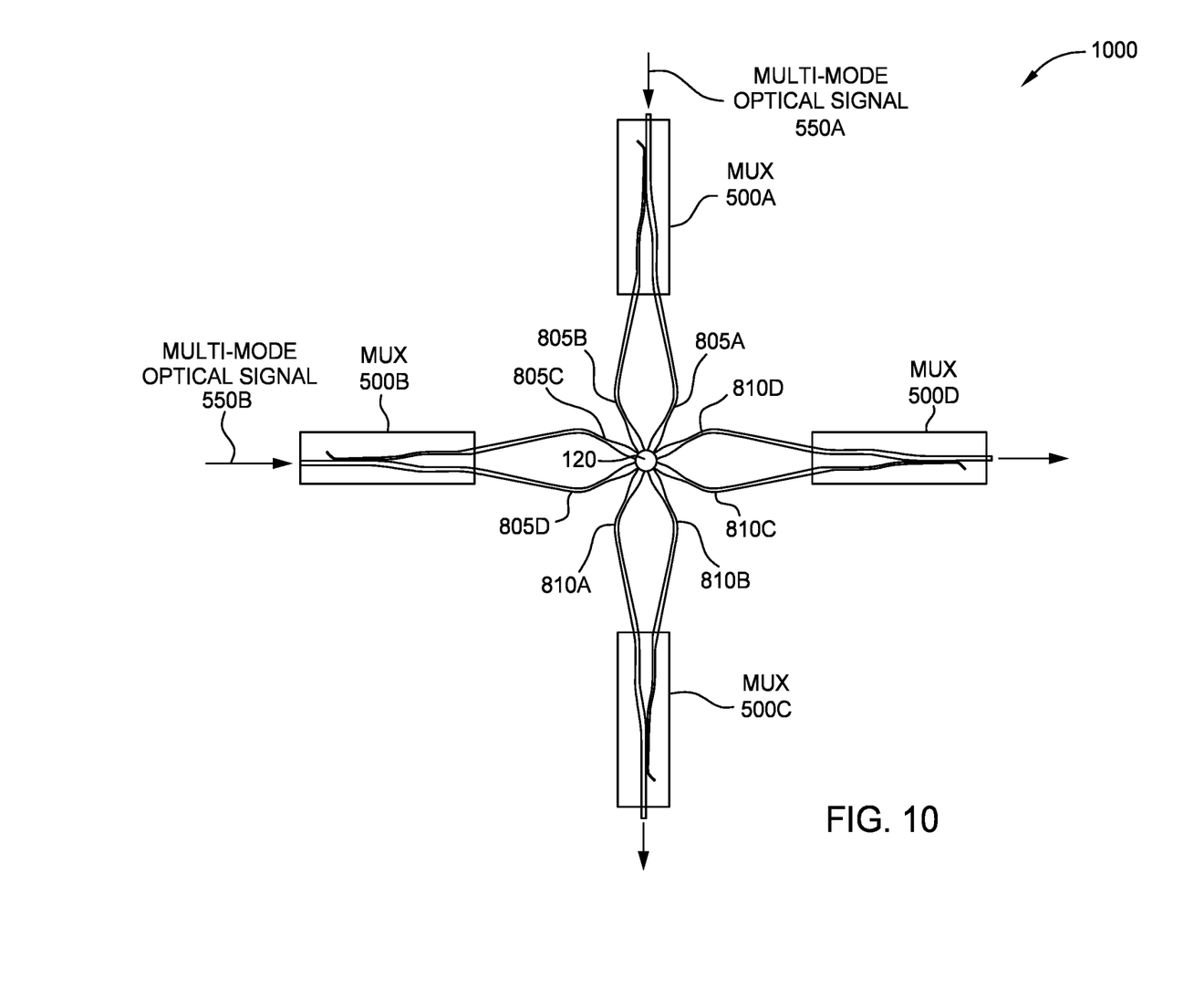
FIG. 10 illustrates a waveguide crossing with broadband mode multiplexers for multi-mode optical signals, according to one embodiment.

FIG. 10 illustrates a waveguide crossing 1000 with broadband mode muxes for multi-mode optical signals, according to one embodiment. In one embodiment, the waveguide crossing 1000 includes the waveguide crossing 800 from FIG. 8 with four input waveguides 805A-D and four output waveguides 810A-D and the circular disc 120.

In this example, the outputs of a first broadband mode mux 500A are attached to the input waveguides 805A and 805B. A multi-mode optical signal 550A is then input into the mux 500A. As discussed in FIG. 5, the mux 500A separates the optical power in the optical signal 550 in the fundamental mode from the optical power in the signal 550A in the first order mode (e.g., a higher order mode). Further, the mux 500A converts the optical power in the signal 550A in the first order mode to the fundamental mode. As such, the input waveguide 805B receives the optical power in the multi-mode optical signal 550A that was in the first order mode but has been converted by the mux 500A into the fundamental mode while the input waveguide 805A receives the optical power in the multi-mode optical signal 550A that was already in the fundamental mode. Thus, both input waveguides 805A and 805B transmit light in the fundamental mode.

The outputs of a second broadband mode mux 500B are attached to the input waveguides 805C and 805D. A multi-mode optical signal 550B is then input into the mux 500B. The mux 500B separates the optical power in the optical signal 550B in the fundamental mode from the optical power in the signal 550B in the first order mode (e.g., a higher order mode). Further, the mux 500B converts the optical power in the signal 550B in the first order mode to the fundamental mode. As such, the input waveguide 805C receives the optical power in the multi-mode optical signal 550B that was in the first order mode but has been converted by the mux 500B into the fundamental mode while the input waveguide 805D receives the optical power in the multi-mode optical signal 550B that was already in the fundamental mode. Thus, both input waveguides 805C and 805D transmit light in the fundamental mode.

After passing through the disc 120, outputs of the output waveguides 810A and 810B are coupled to a third broadband mode mux 500C. The third mux 500C reverses the process performed by the first mux 500A. That is, the optical signal transmitted by the output waveguide 810B is converted back to the first order mode and recombined with the signal transmitted by the output waveguide 810A. That is, because the output waveguide 810B transmits the portion of the multi-mode optical signal 550A that was in the first order mode but was converted into the fundamental mode, the third mux 500C converts this optical signal back to the first order mode and recombines it with the portion of the multi-mode optical signal 550A that was already in the fundamental mode, which was transmitted by the output waveguide 810A. The output of the third mux 500C is the same multi-mode optical signal 550A that was input into the first mux 500A (with minimal insertion loss and crosstalk).

Outputs of the output waveguides 810C and 810D are coupled to a fourth broadband mode mux 500D. The fourth mux 500D reverses the process performed by the second mux 500B. That is, the optical signal transmitted by the output waveguide 810C is converted back to the first order mode and recombined with the signal transmitted by the output waveguide 810D. That is, because the output waveguide 810C transmits the portion of the multi-mode optical signal 550B that was in the first order mode but was converted into the fundamental mode, the fourth mux 500D converts this optical signal back to the first order mode and recombines it with the portion of the multi-mode optical signal 550B that was already in the fundamental mode, which was transmitted by the output waveguide 810D. The output of the fourth mux 500D is the same multi-mode optical signal 550B that was input into the second mux 500B (with minimal insertion loss and crosstalk).

In this manner, the waveguide crossing 1000 can use the muxes 500A-D to efficiently transmit two multi-mode optical signals 550A and 550B through the crossing 1000. By first converting the portions of the multi-mode optical signals 550A and 550B in the first order mode into the fundamental mode before transmitting the signal through the circular disc 120, the insertion loss and crosstalk is minimal. Thus, the waveguide crossing 1000 illustrates an efficient structure for crossing two multi-mode optical signals 550A and 550B.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A waveguide crossing, comprising:
   a first pair of aligned waveguides;
   a second pair of aligned waveguides; and
   a circular disc disposed between the first pair of aligned waveguides and between the second pair of aligned waveguides,
   wherein each of the first pair and the second pair of aligned waveguides has a first portion, wherein the first portions contact the circular disc at a respective end and taper along a respective length as the respective waveguide extends towards the circular disc.

2. The waveguide crossing of claim 1, wherein tapers of the first portions are configured to focus optical signals propagating through the first pair and the second pair of aligned waveguides at a center of the circular disc.

3. The waveguide crossing of claim 1, wherein each of the first pair and the second pair of aligned waveguides has a second portion that flares as the waveguide extends towards the circular disc, wherein the first portion is disposed between the second portion and the circular disc.

4. The waveguide crossing of claim 1, further comprising:
   a third pair of aligned waveguides, wherein the circular disc is disposed between the third pair of aligned waveguides.

5. The waveguide crossing of claim 4, further comprising:
   a first mode multiplexer coupled to two waveguides of the first pair and the second pair of aligned waveguides, wherein the first mode multiplexer is configured to convert a portion of a first multi-mode optical signal from a higher order mode to a fundamental mode; and
   a second mode multiplexer coupled to two remaining waveguides of the first pair and the second pair of aligned waveguides, wherein the second mode multiplexer is configured to convert the portion of the first multi-mode optical signal from the fundamental mode back to the higher order mode.

6. The waveguide crossing of claim 5, further comprising:
   a fourth pair of aligned waveguides, wherein the circular disc is disposed between the fourth pair of aligned waveguides.

7. The waveguide crossing of claim 6, further comprising:
   a third mode multiplexer coupled to two waveguides of the third pair and the fourth pair of aligned waveguides, wherein the third mode multiplexer is configured to convert a portion of a second multi-mode optical signal from the higher order mode to the fundamental mode; and
   a fourth mode multiplexer coupled to two remaining waveguides of the third pair and the fourth pair of aligned waveguides, wherein the fourth mode multiplexer is configured to convert the portion of the second multi-mode optical signal from the fundamental mode back to the higher order mode.

8. A waveguide crossing, comprising:
   a first pair of aligned waveguides;
   a second pair of aligned waveguides; and
   a disc disposed between the first pair of aligned waveguides and between the second pair of aligned waveguides, wherein the disc has a slightly elliptical shape, wherein each of the first pair and the second pair of aligned waveguides has a first portion, wherein the first portions contact the disc at a respective end and taper along a respective length as the respective waveguide extends towards the disc.

9. The waveguide crossing of claim 8, wherein tapers of the first portions are configured to focus optical signals propagating through the first pair and the second pair of aligned waveguides at a center of the disc.

10. The waveguide crossing of claim 8, wherein each of the first pair and the second pair of aligned waveguides has a second portion that flares as the waveguide extends towards the disc, wherein the first portion is disposed between the second portion and the disc.

11. The waveguide crossing of claim 8, further comprising:
a third pair of aligned waveguides, wherein the disc is disposed between the third pair of aligned waveguides.

12. The waveguide crossing of claim 11, further comprising:
a first mode multiplexer coupled to two waveguides of the first pair and the second pair of aligned waveguides, wherein the first mode multiplexer is configured to convert a portion of a first multi-mode optical signal from a higher order mode to a fundamental mode; and
a second mode multiplexer coupled to two remaining waveguides of the first pair and the second pair of aligned waveguides, wherein the second mode multiplexer is configured to convert the portion of the first multi-mode optical signal from the fundamental mode back to the higher order mode.

13. The waveguide crossing of claim 12, further comprising:
a fourth pair of aligned waveguides, wherein the disc is disposed between the fourth pair of aligned waveguides.

14. The waveguide crossing of claim 13, further comprising:
a third mode multiplexer coupled to two waveguides of the third pair and the fourth pair of aligned waveguides, wherein the third mode multiplexer is configured to convert a portion of a second multi-mode optical signal from the higher order mode to the fundamental mode; and
a fourth mode multiplexer coupled to two remaining waveguides of the third pair and the fourth pair of aligned waveguides, wherein the fourth mode multiplexer is configured to convert the portion of the second multi-mode optical signal from the fundamental mode back to the higher order mode.

15. A waveguide crossing, comprising:
a first pair of aligned waveguides;
a second pair of aligned waveguides; and
a disc disposed between the first pair of aligned waveguides and between the second pair of aligned waveguides, wherein the disc has an elliptical shape where a minor axis of the disc has a length that is not more than 10% different from a length of a major axis,
wherein each of the first pair and the second pair of aligned waveguides has a first portion, wherein the first portions contact the disc at a respective end and taper along a respective length as the respective waveguide extends towards the disc.

16. The waveguide crossing of claim 15, wherein the first portions of the first pair and the second pair of aligned waveguides taper as the waveguide extends towards the disc, wherein tapers of the first portions are configured to focus optical signals propagating through the first pair and the second pair of aligned waveguides at a center of the disc.

17. The waveguide crossing of claim 15, wherein each of the first pair and the second pair of aligned waveguides has a second portion that flares as the waveguide extends towards the disc, wherein the first portion is disposed between the second portion and the disc.

18. The waveguide crossing of claim 17, further comprising:
a third pair of aligned waveguides, wherein the disc is disposed between the third pair of aligned waveguides.

19. The waveguide crossing of claim 18, further comprising:
a first mode multiplexer coupled to two waveguides of the first pair and the second pair of aligned waveguides, wherein the first mode multiplexer is configured to convert a portion of a first multi-mode optical signal from a higher order mode to a fundamental mode; and
a second mode multiplexer coupled to two remaining waveguides of the first pair and the second pair of aligned waveguides, wherein the second mode multiplexer is configured to convert the portion of the first multi-mode optical signal from the fundamental mode back to the higher order mode.

20. The waveguide crossing of claim 19, further comprising:
a fourth pair of aligned waveguides, wherein the disc is disposed between the fourth pair of aligned waveguides;
a third mode multiplexer coupled to two waveguides of the third pair and the fourth pair of aligned waveguides, wherein the third mode multiplexer is configured to convert a portion of a second multi-mode optical signal from the higher order mode to the fundamental mode; and
a fourth mode multiplexer coupled to two remaining waveguides of the first pair and the second pair of aligned waveguides, wherein the fourth mode multiplexer is configured to convert the portion of the second multi-mode optical signal from the fundamental mode back to the higher order mode.

* * * * *